(12) United States Patent
Mavuduri

(10) Patent No.: US 11,949,722 B1
(45) Date of Patent: Apr. 2, 2024

(54) ELECTRONIC UNIVERSAL SHARED UTILITY BOARD INFINITE CANVAS SYSTEM

(71) Applicant: Durga Prasad Mavuduri, Irvine, CA (US)

(72) Inventor: Durga Prasad Mavuduri, Irvine, CA (US)

( * ) Notice: Subject to any disclaimer, the term of this patent is extended or adjusted under 35 U.S.C. 154(b) by 0 days.

(21) Appl. No.: 17/963,783

(22) Filed: Oct. 11, 2022

Related U.S. Application Data

(60) Provisional application No. 63/253,978, filed on Oct. 8, 2021.

(51) Int. Cl.
| | | |
|---|---|---|
| *H04L 65/401* | (2022.01) | |
| *H04L 12/18* | (2006.01) | |
| *H04L 67/1095* | (2022.01) | |

(52) U.S. Cl.
CPC .......... *H04L 65/4015* (2013.01); *H04L 12/18* (2013.01); *H04L 67/1095* (2013.01)

(58) Field of Classification Search
CPC .. H04L 65/4015; H04L 12/18; H04L 67/1095
See application file for complete search history.

(56) References Cited

U.S. PATENT DOCUMENTS

| | | | | |
|---|---|---|---|---|
| 7,966,370 B1* | 6/2011 | Pegg | ...................... | G06Q 10/10 709/204 |
| 8,353,012 B2* | 1/2013 | Del Real | ............. | G06F 21/6218 726/4 |
| 10,572,135 B1* | 2/2020 | Fieldman | ................ | H04L 67/06 |
| 2009/0309956 A1* | 12/2009 | Hawkins | ................. | H04M 3/56 348/E7.083 |
| 2011/0065082 A1* | 3/2011 | Gal | .......................... | G09B 7/02 434/365 |
| 2013/0218829 A1* | 8/2013 | Martinez | ................ | G06Q 10/10 707/608 |
| 2014/0026036 A1* | 1/2014 | Jaeger | .................. | G11B 27/034 715/234 |
| 2014/0032771 A1* | 1/2014 | Pegg | ................... | H04L 12/1827 709/228 |

(Continued)

FOREIGN PATENT DOCUMENTS

WO    WO-2011000284 A1 *   1/2011   ......... G06F 17/2288

*Primary Examiner* — Jerry B Dennison
(74) *Attorney, Agent, or Firm* — Plager Schack LLP; Mark H. Plager; Stephen Hallberg

(57) ABSTRACT

An electronic universal shared utility board (EUSUB) that is implemented as an application configured to provide a fully-integrated and all-in-one multi-user collaboration product which enhances share board use is disclosed. The EUSUB combines features and functionality of an electronic shared notice board, an electronic shared whiteboard, a proctoring board, a schedulable electronic e-meeting board, and a productivity utility board. The EUSUB allows users to pin reference documents to shared meeting boards for all users current access and export for later use, annotate audio/video of the session, provide playback of the audio/video to better understand content, and collaborate both synchronously in meeting style and asynchronously in noticeboard style, while at the same time providing more integrations to capture/record and attach the whole discussion in all aspects in one place to be more productive.

14 Claims, 8 Drawing Sheets

(56) References Cited

U.S. PATENT DOCUMENTS

| | | | |
|---|---|---|---|
| 2014/0053252 A1* | 2/2014 | Kelsey | H04L 63/104 726/6 |
| 2014/0372536 A1* | 12/2014 | Ahlgren | H04L 51/52 709/205 |
| 2015/0081734 A1* | 3/2015 | Mason | G06F 16/955 707/772 |
| 2015/0199910 A1* | 7/2015 | Patel | G09B 5/08 434/362 |
| 2016/0162702 A1* | 6/2016 | Tholfsen | G06F 21/6218 726/4 |
| 2016/0179335 A1* | 6/2016 | Thompson | G06F 3/04883 345/173 |
| 2016/0241609 A1* | 8/2016 | Xin | G06F 3/0484 |
| 2017/0046966 A1* | 2/2017 | Velasquez | G09B 7/02 |
| 2019/0012046 A1* | 1/2019 | Marzouk | G06F 3/0482 |
| 2019/0319948 A1* | 10/2019 | Triola | H04L 9/3218 |
| 2020/0066172 A1* | 2/2020 | Hoffmann | G06F 3/1423 |
| 2021/0407310 A1* | 12/2021 | Finch | G06F 40/40 |
| 2022/0368660 A1* | 11/2022 | Niess | H04L 51/18 |

\* cited by examiner

ELECTRONIC UNIVERSAL SHARED UTILITY BOARD INFINITE CANVAS SYSTEM

CLAIM OF BENEFIT TO PRIOR APPLICATION

This application claims benefit to U.S. Provisional Patent Application 63/253,978, entitled "ELECTRONIC UNIVERSAL SHARED UTILITY BOARD INFINITE CANVAS SYSTEM," filed Oct. 8, 2022. The U.S. Provisional Patent Application 63/253,978 is incorporated herein by reference.

BACKGROUND

Embodiments of the invention described in this specification relate generally to interactive shared canvas and collaboration systems, and more particularly, to an electronic universal shared utility board which provides an interactive shared canvas supporting peer-to-peer communication between multiple users online and offline, with one or more whiteboards which serve as schedulable e-meeting room(s), where the electronic universal shared utility board is implemented as an application configured to provide a fully-integrated and all-in-one multi-user collaboration product which enhances user productivity beyond typical share board use.

Currently existing, conventional canvas, share board, and/or collaborative meeting systems are presently limited in their functionality. For instance, some share board providers let users collaborate and save their meetings, they do not let users collaborate asynchronously by sharing the meeting board before and after the meeting or collaborative session. None of the conventional options provide support for both synchronous and asynchronous online collaboration, enable annotation of the audio/video portions of conversations, make reference documents available via the board (like being attached to the board or pinned to the board) for everyone to access before or after a meeting, enable recording (audio/video) meetings and exporting of the proceedings of meetings in any of several forms (e.g., graphics, audio/video annotations, reference documents, etc.), allow for electronic proctoring over multiple student or user boards with the same content by authorizing uniquely identifiable specific boards for each user (e.g., mimicking a real test for students), integrate into all learning management systems so that users can collaborate either/both of synchronously and asynchronously yet also refer to shared content and to allow teachers to prepare the collaboration board ahead of the meeting and be able to conduct and proctor tests for students, integrate into productivity tools like workflow & ticket management systems and customer relationship management (CRM) systems, provide credentialing and e-signature capabilities for multiple parties/users and which is secured by recordation on blocks of an immutable blockchain, and enable secure content-based chat for drawing illustrations and use other chat features to be more productive, among other limitations.

In the current market there is no single (all-in-one) tool that can support all of the following: (1) synchronous and asynchronous online collaboration for multiple users in one tool; (2) annotation of the audio & video portion of a conversation for future reference; (3) ability to "pin/attach" reference documents to the board for everyone to access before or after a meeting; (4) ability to record and export the proceedings of meetings, such as graphics, audio/video annotations, and reference documents; (5) ability to conduct electronic proctoring using multiple boards with the same content to "authorize" one specific board to each user, mimicking a real test for a set of students; (6) ability to integrate into all learning management systems, enabling users to collaborate synchronously and asynchronously and refer to the shared content, including audio/video annotations, reference documents, and to allow teachers to prepare the collaboration board ahead of the meeting and be able to conduct and proctor tests for students; (7) ability to integrate into productivity tools like workflow & ticket management systems, like Jira, and CRM systems where objects are created with graphics, audio/video annotations, and reference documents; (8) ability to provide credentialing and e-signature capture, validate, and persist for multiple parties/users secured on a blockchain; and (9) ability to have secure content-based chat for drawing illustrations and other chat features to enhance productivity for each user and among several users. In fact, the existing, conventional systems in the market are not for multipurpose use. Furthermore, none of the existing, conventional systems in the market support "pinning" or "attaching" reference documents to a shared whiteboard. Also, none of the existing, conventional systems support audio/video annotations by multiple users while collaborating on the whiteboard. Similarly, none of the existing, conventional systems can "export" all components of collaboration, such as graphics, audio/video, and "pinned reference" documents.

Therefore, what is needed is a way to provide the features of several applications in an all-in-one canvas tool.

BRIEF DESCRIPTION

An electronic universal shared utility board (EUSUB) infinite canvas system and EUSUB infinite canvas processes are disclosed. In some embodiments, the EUSUB infinite canvas system and the and EUSUB infinite canvas processes are implemented in an application with a multi-layer architecture configured to provide a fully-integrated and all-in-one multi-user collaboration product which enhances user productivity beyond typical share board use. In some embodiments, the EUSUB infinite canvas system comprises a combination of an electronic shared whiteboard, an electronic shared meeting board (also referred to as the "schedulable electronic e-meeting board"), a productivity utility board, a proctoring board, an electronic shared notice board, a crypto credentialing and signature board, and a secure content-based chat board.

In some embodiments, the EUSUB infinite canvas system is configured to allow users to dissipate and share information on their canvas with one or multiple boards via tools that allow users to (i) "pin reference documents" on the shared meeting board that all the other users can access with the ability to users to make these documents eligible for export by other users and/or for further use, (ii) "annotate the audio/video of the session with contextual text" at any point of time during the meeting/session and as many annotations that are required, whereby users can replay, refer to, and reuse the audio/video of the files to better understand the content, and (iii) collaborate both synchronously in meeting style and asynchronously in noticeboard style with all the productivity features accessible and available. In some embodiments, the EUSUB infinite canvas system provides integrations to capture/record and attach whole discussion(s) in all aspects (audio/video, graphics, reference documents, etc.) in one place to be more productive.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
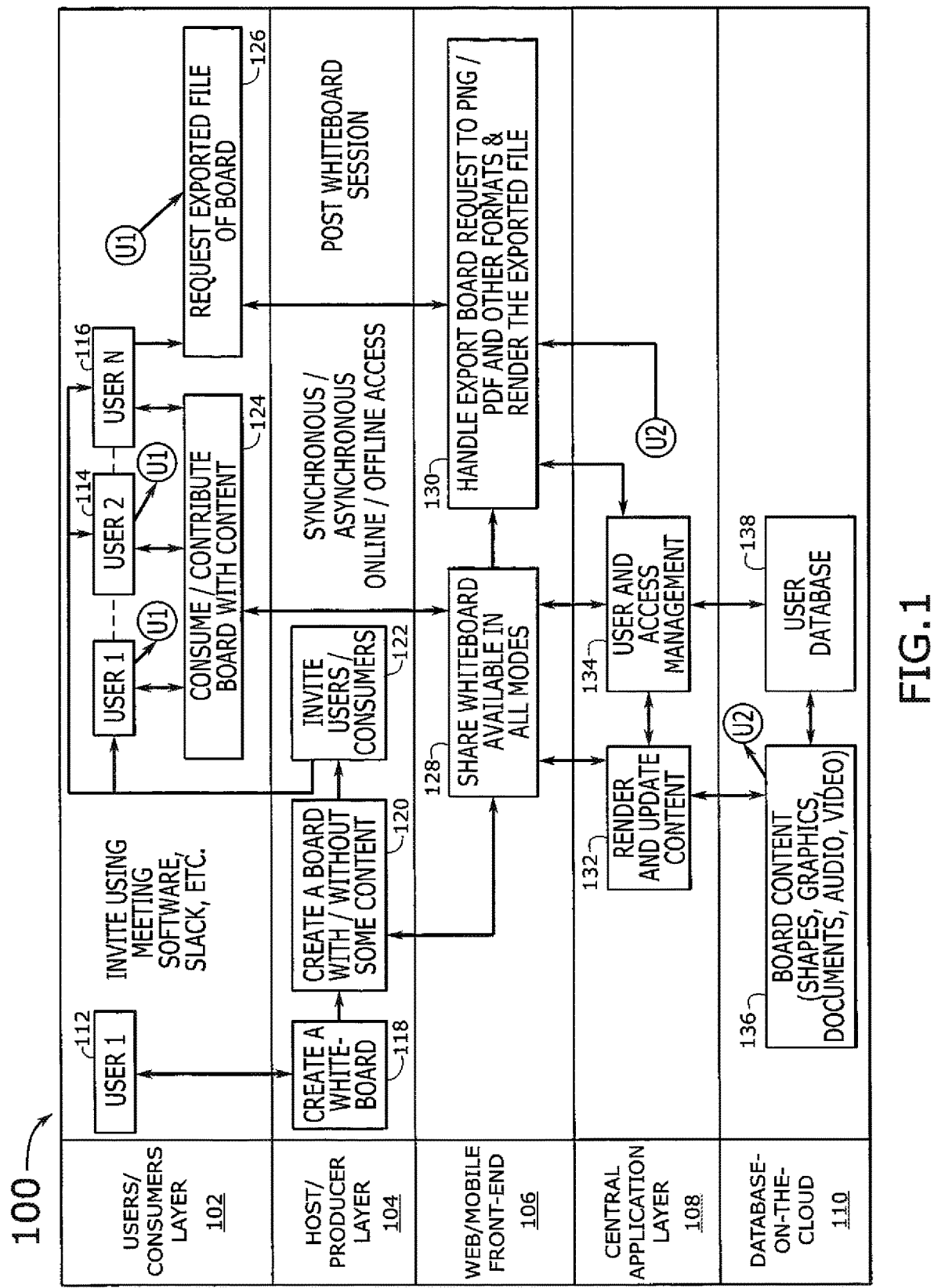
FIG. 1 conceptually illustrates a shared whiteboard process for creating, sharing, and using a shared whiteboard by way of an electronic universal shared utility board (EUSUB) infinite canvas system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel electronic universal shared utility board (EUSUB) infinite canvas system and EUSUB infinite canvas processes implemented in an application with a multi-layer architecture configured to provide a fully-integrated and all-in-one multi-user collaboration product which enhances user productivity beyond typical share board use. In some embodiments, the EUSUB infinite canvas system comprises a combination of an electronic shared whiteboard, an electronic shared meeting board (also referred to as the "schedulable electronic e-meeting board"), a productivity utility board, a proctoring board, an electronic shared notice board, a crytpo credentialing and signature board, and a secure content-based chat board.

In some embodiments, the EUSUB infinite canvas system is configured to allow users to dissipate and share information on their canvas with one or multiple boards via tools that allow users to (i) "pin reference documents" on the shared meeting board that all the other users can access with the ability to users to make these documents eligible for export by other users and/or for further use, (ii) "annotate the audio/video of the session with contextual text" at any point of time during the meeting/session and as many annotations that are required, whereby users can replay, refer to, and reuse the audio/video of the files to better understand the content, and (iii) collaborate both synchronously in meeting style and asynchronously in noticeboard style with all the productivity features accessible and available. In some embodiments, the EUSUB infinite canvas system provides integrations to capture/record and attach whole discussion(s) in all aspects (audio/video, graphics, reference documents, etc.) in one place to be more productive.

As stated above, the conventional canvas, share board, and collaborative meeting systems do not provide or support an all-in-one solution that meets the demands of users in the market, such as supporting both synchronous and asynchronous shared board access and utility during a meeting or collaborative multi-user session and either before or after the meeting or collaborative session (or both before and after the meeting), enabling users to annotate audio/video conversations of meetings, make reference documents available via "pinning" to the board which when attached allow other users to access the reference documents before, during, or after a meeting, record (audio/video) and export graphics, annotations, documents, etc., about the proceedings of meetings, allow for electronic proctoring over multiple students by a teacher authorizing specific identifiable boards for different students where the same content is shared but the uniquely identifiable specific boards for each student user mimics a real test for students, integrate into all learning management systems so that users can collaborate either/both of synchronously and asynchronously yet also refer to shared content and to allow teachers or other users to prepare the collaboration board ahead of the meeting and be able to conduct and proctor tests for students, and integrate into productivity tools like workflow & ticket management systems and customer relationship management (CRM) systems, provide credentialing and e-signature capabilities for multiple parties/users and which is secured by recording on blocks of an immutable blockchain, and enable secure content-based chat for drawing illustrations and use other chat features to be more productive, among other limitations. Embodiments of the EUSUB infinite canvas system described in this specification solve such problems by combining features from several applications including, without limitation, an electronic shared notice board, an electronic shared whiteboard, a proctoring board, a schedulable electronic e-meeting board, a productivity utility board, a crypto-based credentialing and signature board, and a secure content-based chat board. In this way, the EUSUB provides an all-in-one an infinite shared interactive canvas system that allows users to dissipate/share information on their canvas with one or multiple boards.

In some embodiments, the EUSUB infinite canvas system provides a shared noticeboard infinite canvas system (also referred to in short as the "share noticeboard"). In some embodiments, the shared noticeboard is configured to allow users to dissipate or share information on their canvas with one or multiple boards that can be accessed offline/asynchronously. These boards are like noticeboards with "pinned documents" and audio, visual notes that can be updated and/or accessed by one or multiple users asynchronously.

In some embodiments, the EUSUB infinite canvas system provides a shared whiteboard infinite canvas system (also referred to in short as the "shared whiteboard"). In some embodiments, the shared whiteboard is configured to allow users to dissipate or share information through their canvas with one or multiple boards for all users to access through synchronous peer-to-peer communication. These boards are like whiteboards with "pinned documents" and audio, visual notes that can be updated and/or accessed synchronously by one or multiple users.

In some embodiments, the EUSUB infinite canvas system provides a proctoring board infinite canvas system (also referred to in short as the "proctoring board"). In some embodiments, the proctoring board is configured to provide any user (a host or a proctor) the ability to set up multiple boards with test information and share the boards with one or multiple users where each of multiple recipient users can access one, and only one, assigned board. A recipient user can contribute information back on their assigned board (and only on their assigned board) synchronously and asynchronously. The host or proctor maintains access to all the boards and monitor the activities of each recipient user with respect to their particular assigned board. These boards are like an online examination room where the recipient users can update and share the content on their respective assigned board, with "pinned documents" and audio, visual notes that can be updated and/or accessed by the host or proctor synchronously and asynchronously.

In some embodiments, the EUSUB infinite canvas system provides an e-meeting board infinite canvas system (also referred to in short as the "e-meeting board"). In some embodiments, the e-meeting board is configured to allow users to dissipate or share information through their canvas with one or multiple boards for all users to access through synchronous peer-to-peer communication at a scheduled time by the initiator of the collaboration. These boards are like meeting rooms equipped with whiteboards and with "pinned documents" and audio, visual notes that can be updated and/or accessed synchronously by one or multiple users. In addition, the e-meeting board allows users to record the audio and video of the participants in the collaboration.

In some embodiments, the EUSUB infinite canvas system provides a productivity utility board infinite canvas system (also referred to in short as the "productivity utility board"). In some embodiments, the productivity utility board is configured to allows users to connect with and access productivity tools, the information dissipated and shared through the canvas with one or multiple boards can be exported and transferred through built-in application programming interfaces (APIs) to the productivity tools for further use or archiving. The productivity tools can be learning management systems, CRM systems, enterprise resource planners or other enterprise systems, Kanban systems, document management systems, archival systems, etc.

In some embodiments, the EUSUB infinite canvas system provides a crypto-based credentialing and signature board infinite canvas system (also referred to in short as the "crypto-based credentialing and signature board"). In some embodiments, the crypto-based credentialing and signature board is configured to enable users of multiple parties to synchronously and/or asynchronously review of one or more documents (as many documents as required). The crypto-based credentialing and signature board is further configured to enable recording audio and video of all the participants that could be used for credentialing. Additionally, the crypto-based credentialing and signature board is configured as an e-signature product that collects signatures, as needed, necessary, or required, to make the reviewed documents valid e-signed documents. Furthermore, the crypto-based credentialing and signature board is configured to export and immutably stored audio, video, and the reviewed e-signed documents to a hyper-ledger (blockchain).

In some embodiments, the EUSUB infinite canvas system provides a secure content-based chat board infinite canvas system (also referred to in short as the "secure content-based chat board" or "chat board"). In some embodiments, the secure content-based chat board is built into the EUSUB infinite canvas system and configured to provide group and private chat, drawing tools, document sharing, and audio/video recording. In some embodiments, the secure content-based chat board is configured to allow object locking, which is a mechanism for locking of the objects in the chat to provide enhanced security during the chat. The secure content-based chat board provides such chat feature with the aforementioned tools so that it can be widely adopted and used for content-based chat, such as by education groups (teacher and students), professionals, healthcare professional groups, software development teams, and project teams, etc.

Embodiments of the EUSUB infinite canvas system described in this specification differ from and improve upon currently existing options. In particular, unlike any other tool currently available in the market, the EUSUB infinite canvas system of the present disclosure is an all-in-one tool with a combination of electronic shared notice board, electronic shared whiteboard, proctoring board, schedulable electronic e-meeting board, productivity utility board, crypto-based credentialing and signature board, and secure content-based chat board.

By contrast, the existing, conventional systems are built to serve as share boards synchronously only (not asynchronously), and lack productive features, such as (i) "pinning reference documents" on the shared board which all the users can access, (ii) user annotation tools that enable users to annotate the audio/video of the session with the contextual text at any point of time during the meeting or session and by providing as many annotations as needed or required, (iii) export capabilities of the session (graphics, audio/video, and reference documents), among other features available to users of the EUSUB infinite canvas system.

The EUSUB infinite canvas system of the present disclosure may be comprised of the following elements. This list of possible constituent elements is intended to be exemplary only and it is not intended that this list be used to limit the EUSUB infinite canvas system of the present application to just these elements. Persons having ordinary skill in the art relevant to the present disclosure may understand there to be equivalent elements that may be substituted within the present disclosure without changing the essential function or operation of the EUSUB infinite canvas system.

1. Electronic Shared Noticeboard
2. Electronic Shared Whiteboard
3. Electronic Meeting Board (or "e-meeting board")
4. Productivity Utility Board
5. Proctoring Board
6. Crypto-Based Credentialing And Signature Board
7. Secure Content-Based Chat Board The various elements of the EUSUB infinite canvas system of the present disclosure may be related in the following exemplary fashion. It is not intended to limit the scope or nature of the relationships between the various elements and the following examples are presented as illustrative examples only. The EUSUB infinite canvas system comprises a combination of electronic shared noticeboard, electronic shared whiteboard, electronic meeting board, productivity utility board, proctoring board, crypto-based credentialing and signature board, and secure content-based chat board, all features of which are packed into one tool using various open-source and custom-built software components.

In some embodiments, the shared noticeboard allows users to dissipate/share information on their canvas with one or multiple boards that can be accessed offline/asynchronously. These boards are like noticeboards with "pinned documents" and audio, visual notes that can be updated and/or accessed by one or multiple users asynchronously.

In some embodiments, the shared whiteboard is configured to enable synchronous peer-to-peer communication and allows users to dissipate/share information through the canvas with one or multiple boards for all users to access. These boards are like whiteboards with "pinned reference documents" and "annotations" of audio, visual notes that can be updated and/or accessed synchronously by one or multiple users.

In some embodiments, the proctoring board provides a host user or a proctor user the ability to set up multiple boards with test information and share the boards with one or multiple users where each recipient user is "assigned" one of the boards and "authorized" to access only the assigned board. A recipient user can contribute information back on the assigned board synchronously and asynchronously. The host or proctor will have access to all the boards and monitor the recipient user's activities on the assigned board corresponding to the recipient user. These boards are like an online examination room where the recipients can update the shared content on the board assigned to them, with "pinned documents" and audio, visual notes that can be updated and/or accessed by the host or proctor synchronously and asynchronously, while having capability to integrate into the grade books of learning management systems.

In some embodiments, the e-meeting board allows a collaboration initiator to schedule meetings or sessions and enables users in the schedule meetings/sessions to record the audio and video of the participants in the collaboration. The e-meeting board is further configured to allow users to dissipate/share information through the canvas with one or multiple boards that can be accessed by all users by peer-to-peer communication synchronously at a scheduled time by the initiator of the collaboration. As such, these boards are like meeting rooms that are equipped with whiteboards that allow for reference documents to be "pinned" and audio, visual notes to be updated and/or accessed synchronously by one or multiple users.

In some embodiments, the productivity utility board allows users to connect with productivity tools; the information dissipated/shared through the canvas with one or multiple boards can be easily exported and transferred through built-in APIs to the productivity tools for further use or archiving. These productivity tools can be learning management systems, customer relationship management systems, enterprise resource planners, Kanban systems, document management systems, any enterprise systems, and archival systems.

In some embodiments, the crypto-based credentialing and signature board enables multi-party meetings, exporting and storing of audio, video, and the reviewed documents with signatures to a hyper-ledger (blockchain) to make this system a crypto-based credentialing and e-signature board.

In some embodiments, the secure content-based chat board is a group and private chat tool with drawing tools, document sharing, and audio & video recording. The chat tool also provides enhanced security via object locking in the chat to give another level of security. The chat feature with all these tools can be used for content-based chat used by users, professionals, and other such groups of users, for example, healthcare professional groups, software development teams, project teams, etc.

To make the EUSUB infinite canvas system of the present disclosure, a person may implement a software system that (i) efficiently integrates various utilities into one tool, (ii) provides a user interface for the user experience (typically with simple design concepts), (iii) supports a cloud application service architecture founded on design thinking and collaborative software architecture, (iv) support team collaborations online and offline, as well as education, meetings, etc., electronically, (v) e-meeting software and session management/technology, (vi) provide learning management sub-system, (vii) provide productivity tools and processes to integrate them into the EUSUB infinite canvas system application, (viii) provide meeting software features, similar to existing meeting software, such as Zoom and conversational software apps such as Slack, etc., but extended with the combination of features provided by the EUSUB infinite canvas system, (ix) enable user authorizations against software objects to achieve desired control and compliance, (x) provide cyber-security mechanisms to make the application secure, such as recording transactions on blocks of a blockchain, and providing e-signature of materials for crypto-based credentialing, and (xi) enable secure multi-user chat.

As a software system, the EUSUB infinite canvas system of the present disclosure may be built upon existing technology that presently exist in disparate, separate utilities, tools, software programs, or other systems. In some cases, existing open-source technology can be incorporated into the overall makeup of the EUSUB infinite canvas system. An exemplary list of technology, systems, open source software, etc., that could be used to make the EUSUB infinite canvas system includes, without limitation, a real-time collaboration module for e-meetings, streaming, and screen sharing (e.g., WebRTC technology), a user management module to manage subscriptions, authorizations, and compliance (e.g., MERN stack technology—MongoDB, Express, React JS, Node JS), one or more integration APIs built to connect to various third party systems (e.g., APIs built in Java technology), an export and file handling mechanism (e.g., MERN Stack technology), a security module for security and encryption (e.g., Java and MERN stack), a central orchestrator for canvas and board handling (e.g., excalidraw open source), a front-end interface system built in, for example, HTML, CSS, JavaScript, React JS, etc. The EUSUB infinite canvas system can run as implemented according to the above items. However, some embodiments of the EUSUB infinite canvas system integrate one or more artificial intelligence (AI) modules to understand user behavior on the board(s). In this way, the EUSUB infinite canvas system as complemented by AI modules, tools, algorithms, databases, etc., could help users to improve their collaboration with each other.

By way of example, FIG. 1 conceptually illustrates a shared whiteboard process for creating, sharing, and using a shared whiteboard 100 by way of an electronic universal shared utility board (EUSUB) infinite canvas system. Previously, it was noted (above) that the EUSUB infinite canvas system is implemented in an application with a multi-layer architecture. The multi-layer architecture of the EUSUB infinite canvas system is demonstrated in this figure by a plurality of layers 102-110, with corresponding components, actions, and operations of the shared whiteboard process 100 shown in each of the layers. Specifically, the plurality of layers 102-110 of the EUSUB infinite canvas system comprises a users/consumers layer 102, a host/producer layer 104, a web/mobile front-end 106, a central application layer 108, and a database-on-the-cloud 110 layer (also referred to as the "database layer 110").

As described above, a key feature of any board(s)/whiteboard created in the EUSUB infinite canvas system is information sharing and dissipation. Specifically, the EUSUB infinite canvas system allows users share and dissipate information through their canvas with one or multiple boards for all users to access through synchronous peer-to-peer communication. Thus, in the users/consumers layer 102, a first user ("USER 1") 112 may select an option to create a whiteboard, which results in creation of a new whiteboard (at 118) in the host/producer layer 104. (Note, any authorized 'user' can create a new whiteboard, but for purposes of clarity in description, we call this the 'first user' without connoting an order or preference of any sort.) Referring back to the creation of the new whiteboard (at 118), the first user 112 can create a new whiteboard with or without content (at 120) and can invite other users/consumers (at 122) to access the whiteboard. Users have many options to invite other users including, without limitation, via meeting software, slack, text, etc. In this figure, the first user 112 has invited multiple other users including a second user ("USER 2") 114 and another user ("USER N") 116. Once the users have access to the whiteboard, they may individually or collaboratively consume whiteboard content and/or contribute content to the shared whiteboard (at 124). When content is contributed, the whiteboard treats the content items as "pinned documents", so to speak, along with audio and/or visual notes that can be updated and/or accessed synchronously by the first user 112, the second user 114, the another user 116, and any other user who may be invited to access the whiteboard. Additionally, one or more of these users may access the whiteboard asynchronously or in offline mode as needed, when the whiteboard is configured to be shared in both synchronous and asynchronous mode. This is described in more detail below.

Also, each of the users may request an exported file of the whiteboard (at 126) to use for asynchronous (offline) access or simply to have a local copy. Specifically, the request to export the whiteboard to a file (at 126) by the first user 112 and the second user 114 is shown by flow-arrows to an alpha-numeric identifier "U1" and out from the alpha-numeric identifier "U1" to the step for requesting the exported file of the whiteboard (at 126) in the users/consumers layer 102. Similarly, when a 'whiteboard session' ends (such as a calendar meeting-based whiteboard session, which is described further below, by reference to FIG. 2), the host/producer layer 104 in some embodiments of the EUSUB infinite canvas system automatically posts an exported file of the whiteboard session.

As noted above, invited users can access the whiteboard synchronously (by default) or asynchronously when the whiteboard is configured to permit offline/asynchronous access. This is shown in the web/mobile front-end 106 layer, whereby the first user 112 can choose to share the whiteboard and make it available in all modes (at 128). This can be done on a board-by-board basis, such that a first board of the whiteboard is available in all modes and a second board of the whiteboard is limited to only synchronous access mode.

In some embodiments, when the shared whiteboard process 100 performs the step for sharing the whiteboard and making it available in select modes (at 128), the shared whiteboard process 100 also renders and updates (at 132) the content contributed (at 124) to the whiteboard by any of the users. The rendering and updating operations occur in the central application layer 108 (also referred to as the "application layer 108"). Furthermore, the shared whiteboard process 100 performs user and access management (at 134) in the central application layer 108. For instance, the host/producer (in this example, the first user 112) may configure user and access management settings for all users to allow both synchronous (online) and asynchronous (offline) access to the whiteboard canvas, or some users to have both synchronous and asynchronous access to the whiteboard canvas while other users are limited to only synchronous (online) access.

Also, depending on the synchronous/asynchronous mode configuration of whiteboard, the shared whiteboard process 100 also handles export board requests (at 130) in the web/mobile front-end 106 layer. Specifically, requests to export to a file (at 126) by users in the user/consumers layer 102 are handled in the web/mobile front-end 106, such that the whiteboard gets exported to an image format (e.g., PNG), a document format (e.g., PDF), or other formats. To complete this operation, the shared whiteboard process 100 checks the user and access management settings (at 134) for the requesting user and, if permitted, renders the exported file (at 130) with board content 136 (shown by the flow arrow to alpha-numeric identifier "U2" and out from the alpha-numeric identifier "U2" to the step for handling the export board request (at 130) in the web/mobile front-end 106 layer). In some embodiments, the shared whiteboard process 100 retrieves the board content 136 from the user database 138 in the database layer 110. The board content 136 includes, without limitation, shapes, graphics, documents, audio clips, video files, etc.

Figure 2:
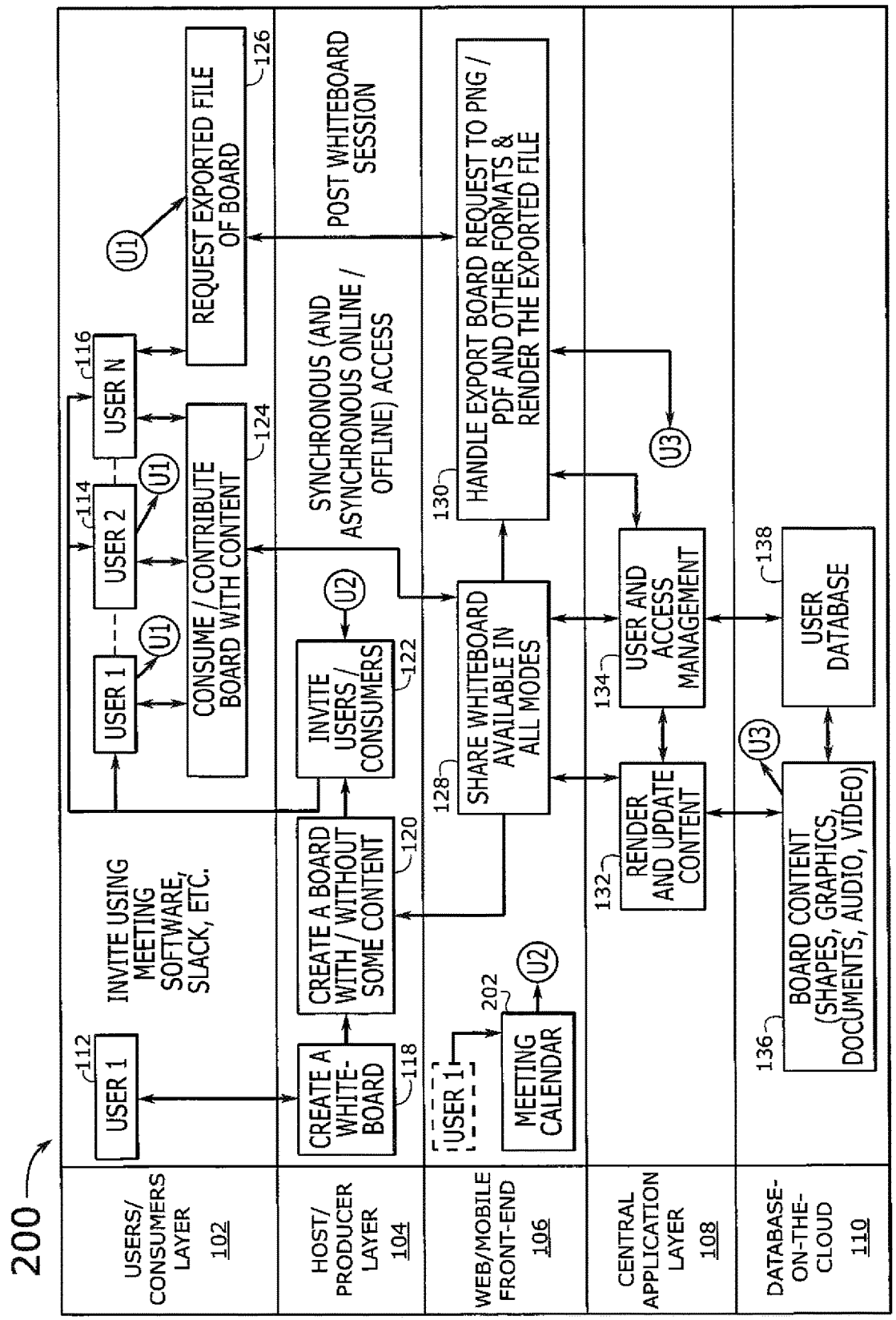
FIG. 2 conceptually illustrates a shared meeting board process for creating, sharing, and using a shared meeting board via the electronic universal shared utility board (EUSUB) infinite canvas system in some embodiments.

Now, turning to another view of the electronic universal shared utility board (EUSUB) infinite canvas system, FIG. 2 conceptually illustrates a shared meeting board process 200 for creating, sharing, and using a shared meeting board via the EUSUB infinite canvas system. While this figure demonstrates the whiteboard function described above, by reference to FIG. 1, the shared meeting board process 200 of FIG. 2 also demonstrates an e-meeting board function of the EUSUB infinite canvas system. The e-meeting board function is a convenient way to initiate a synchronous whiteboard session (such as through meeting/calendar user software system) with a whiteboard canvas that can be utilized for the meeting to share ideas, content, notes, audio, video, etc. The whiteboard canvas created for e-meetings are like meeting rooms equipped with whiteboards and with "pinned documents" and audio, visual notes that can be updated and/or accessed synchronously by one or multiple users. In addition, the e-meeting board feature allows users to record the audio and video of the participants in the collaboration. This is consistent for the e-meeting since all users access the canvas through synchronous peer-to-peer communication at a scheduled time by the host/producer (in this example, the first user 112) of the collaboration. When the whiteboard session ends, the content of the whiteboard canvas can be exported and posted for availability to all users in the session (and other applicable users). Thus, for most purposes, the steps, operations, actions, and the plurality of layers 102-110 of the EUSUB infinite canvas system shown in this figure are the same as those shown in FIG. 1, with a change in the shared meeting board process 200 step for inviting users/consumers (at 122) as being possible through the conventional methods noted above, by reference to FIG. 1, and now, through the meeting calendar (at 202) by following the flow arrow "U2" out of the step in which the first user 112 goes to the meeting calendar (at 202) in the web/mobile front-end 106 layer and to the step for inviting users/consumer (at 122) in the host/producer layer 104.

Figure 3:
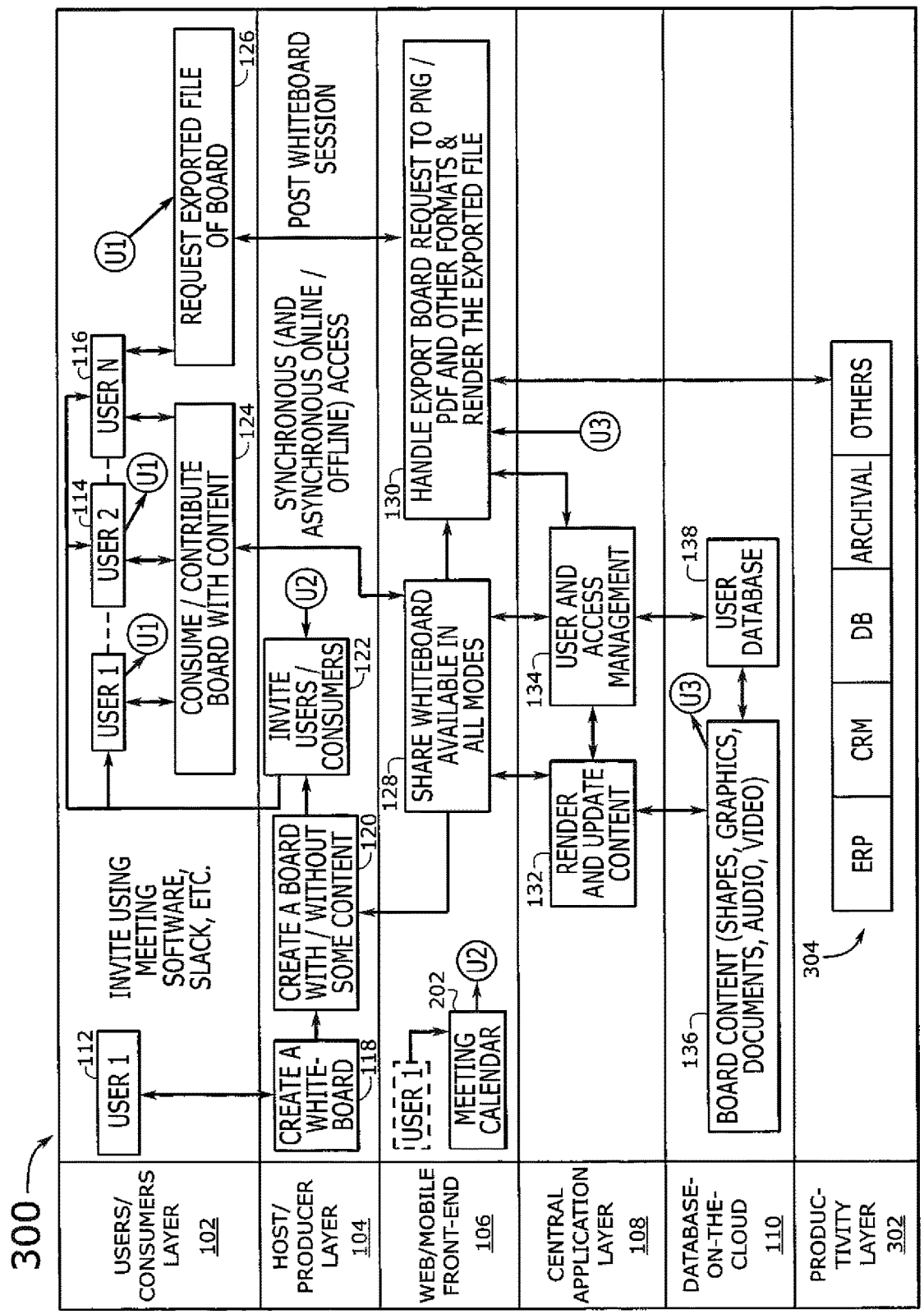
FIG. 3 conceptually illustrates a productivity utility board process for creating, sharing, using, and exporting a productivity utility board via the electronic universal shared utility board (EUSUB) infinite canvas system in some embodiments.

Referring to another aspect of the electronic universal shared utility board (EUSUB) infinite canvas system, FIG. 3 conceptually illustrates a productivity utility board process for creating, sharing, using, and exporting a productivity utility board 300 via the electronic universal shared utility board (EUSUB) infinite canvas system. To demonstrate features of the EUSUB infinite canvas system that support the productivity utility board process 300, an additional layer of the application's multi-layer architecture is shown in this figure. Specifically, the multi-layer architecture shows the plurality of layers as including a productivity layer 302. Thus, the plurality of layers 102-110 and 302 of the EUSUB infinite canvas system comprises the users/consumers layer 102, the host/producer layer 104, the web/mobile front-end 106, the central application layer 108, the database-on-the-cloud 110 layer, and the productivity layer 302 through which users of the EUSUB infinite canvas system can access and use various productivity tools. As such, the EUSUB infinite canvas system in this case is configured to provide a productivity utility board in connection with several productivity utility board tools (at 304). In some embodiments, the productivity utility board is configured to allows users to connect with and access a variety of productivity tools (at 304). Examples of productivity tools including, without limitation, enterprise resource planning (ERP) systems, customer relationship management (CRM) systems, databases (DB) and database management systems, archival systems, learning management systems (LMS), application software systems (or "software applications"), blockchain/distributed ledger systems, communication systems such as chat, etc., and others. Furthermore, the information dissipated and shared through the canvas with one or multiple whiteboards, meeting boards, productivity utility boards, etc., can be exported and transferred through built-in application programming interfaces (APIs) to the productivity tools for further use or archiving. The productivity tools can be learning management systems, CRM systems, enterprise resource planners or other enterprise systems, Kanban systems, document management systems, archival systems, etc.

Specifically, the productivity utility board process for creating, sharing, using, and exporting a productivity utility board 300 can be initiated as a synchronous/asynchronous whiteboard, as described above by reference to FIG. 1, or as an e-meeting board, such as that described above by reference to FIG. 2. As a productivity utility board, however, access to several productivity tools enhances any whiteboard session and the associated content which is contributed by the users to their canvas. Also, requests to export whiteboard canvas/session to file can by handled in connection with the productivity utility board tools (at 304), such as by being stored in archival format or in a persistent database, with links into ERP and CRM enterprise applications, and others (at 304).

In some embodiments, the EUSUB infinite canvas system provides a proctoring board infinite canvas system (also referred to in short as the "proctoring board"). In some embodiments, the proctoring board is configured to provide any user (a host or a proctor) the ability to set up multiple boards with test information and share the boards with one or multiple users where each of multiple recipient users can access one, and only one, assigned board. A recipient user can contribute information back on their assigned board (and only on their assigned board) synchronously and asynchronously. The host or proctor maintains access to all the boards and monitor the activities of each recipient user with respect to their particular assigned board. These boards are like an online examination room where the recipient users can update and share the content on their respective assigned board, with "pinned documents" and audio, visual notes that can be updated and/or accessed by the host or proctor synchronously and asynchronously. An example of proctoring board usage is described next, by reference to FIG. 4.

Figure 4:
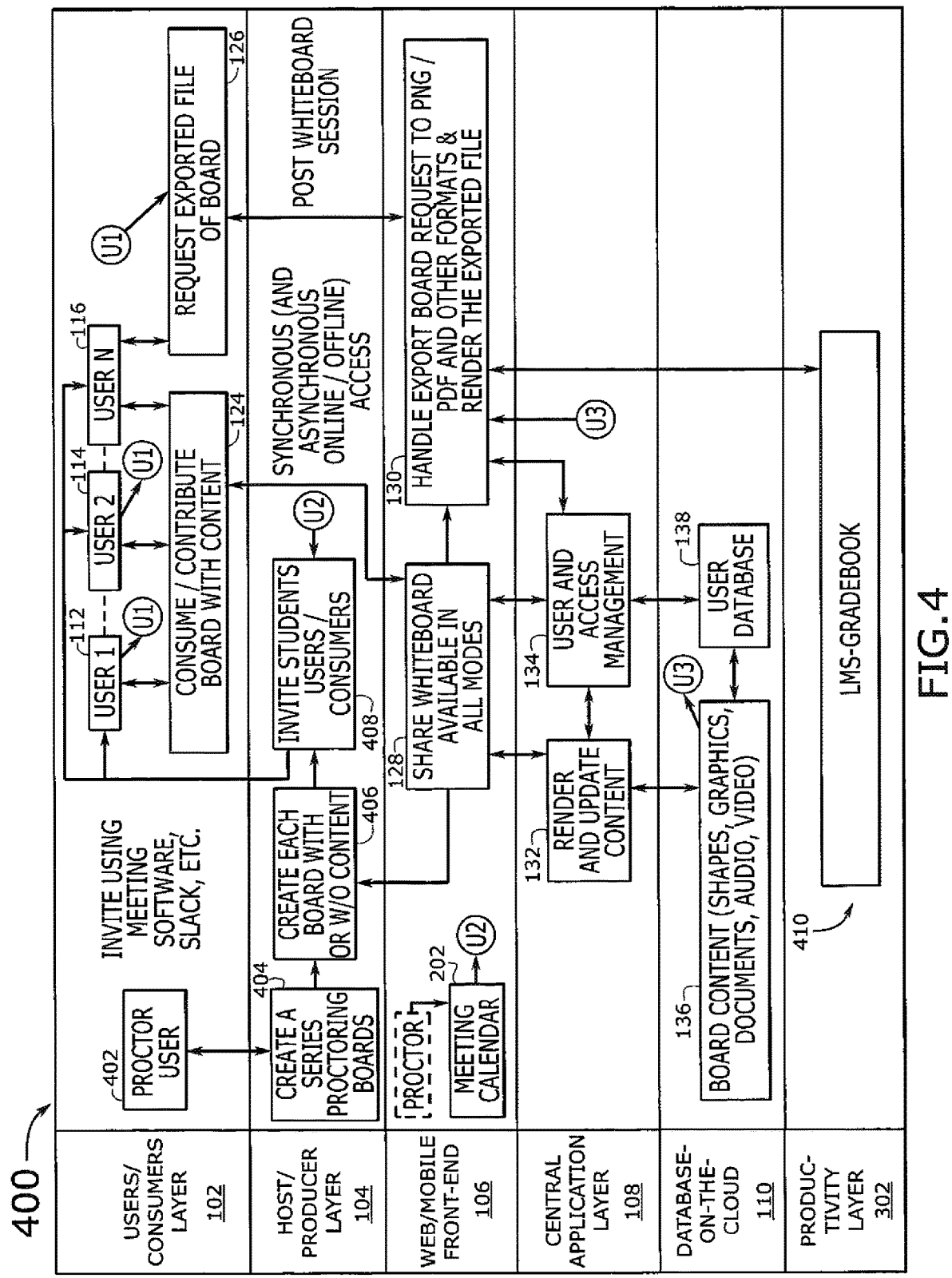
FIG. 4 conceptually illustrates a proctoring board process for creating and using a proctoring board by a proctor in connection with a shared whiteboard utilized by users of the electronic universal shared utility board (EUSUB) infinite canvas system in some embodiments.

Specifically, FIG. 4 conceptually illustrates a proctoring board process for creating and using a proctoring board 400 by a proctor in connection with a shared whiteboard utilized by users of the electronic universal shared utility board (EUSUB) infinite canvas system. While this figure demonstrates the whiteboard function (described above by reference to FIG. 1) and the e-meeting board function (described above by reference to FIG. 2) of the EUSUB infinite canvas system, the productivity layer 302 demonstrates a different use as a proctoring board tool for use with any learning management system or grade book of a teacher, instructor, leader, or other such proctor (hereinafter referred to as the "proctor"). Thus, the plurality of layers 102-110 and 302 are demonstrated in a similar architecture as that of the EUSUB infinite canvas system shown in FIG. 3, but with changes of functional components within the layers for proctoring board usage.

Specifically, the proctoring board process for creating and using a proctoring board 400 starts when a proctor user 402 (or "proctor", "teacher", "instructor", "mentor", "leader", etc.) creates a series of proctoring boards (at 404). In this case, each proctoring board is created with or without content (at 406). Also, students (or consumer or other users) are invited (at 408) to participate with respect one proctoring board. The proctor 402 could also initiate the proctoring board session at a specific day/time via invitations to the users through the meeting/calendar software (at 202). Once invited, each user is associated with an individual proctor board in the series of proctoring boards. Thus, the first user 112 is associated with a first proctoring board, the second user 114 is associated with a second proctoring board, and so on to the Nth user 116 who is associated with the Nth proctoring board created in the series. The proctor 402 (who is the host) may utilize a learning management system ("LMS") gradebook in the productivity layer 302 while maintaining access to all the proctoring boards. Similarly, the proctor 402 may monitor the activities of each user with respect to their particular assigned proctoring board. Since the activities may be accessible synchronously or asynchronously, the monitoring of usage and activity of the users by the proctor 402 is dependent on the setting. For example, if the proctoring board is created for a homework project which students are assigned to do at home, then asynchronous access will be set for each user with respect to his or her assigned proctoring board, but for an examination, there may be a timed meeting calendar session in which each proctoring board can be interacted by the corresponding user only during the alloted time and only in a synchronous (online) mode, which the proctor may then monitor by collective viewing of all the proctoring boards in the canvas in realtime as the examination is ongoing. In this way, the proctoring boards enable a feature in which the EUSUB infinite canvas system can act like an online examination room where the recipient users can update and share the content on their respective assigned proctoring board, with "pinned documents" and audio, visual notes that can be updated and/or monitored/accessed in realtime by the proctor synchronously or accessed (such as for grading/evaluation of performance) asynchronously.

Figure 5:
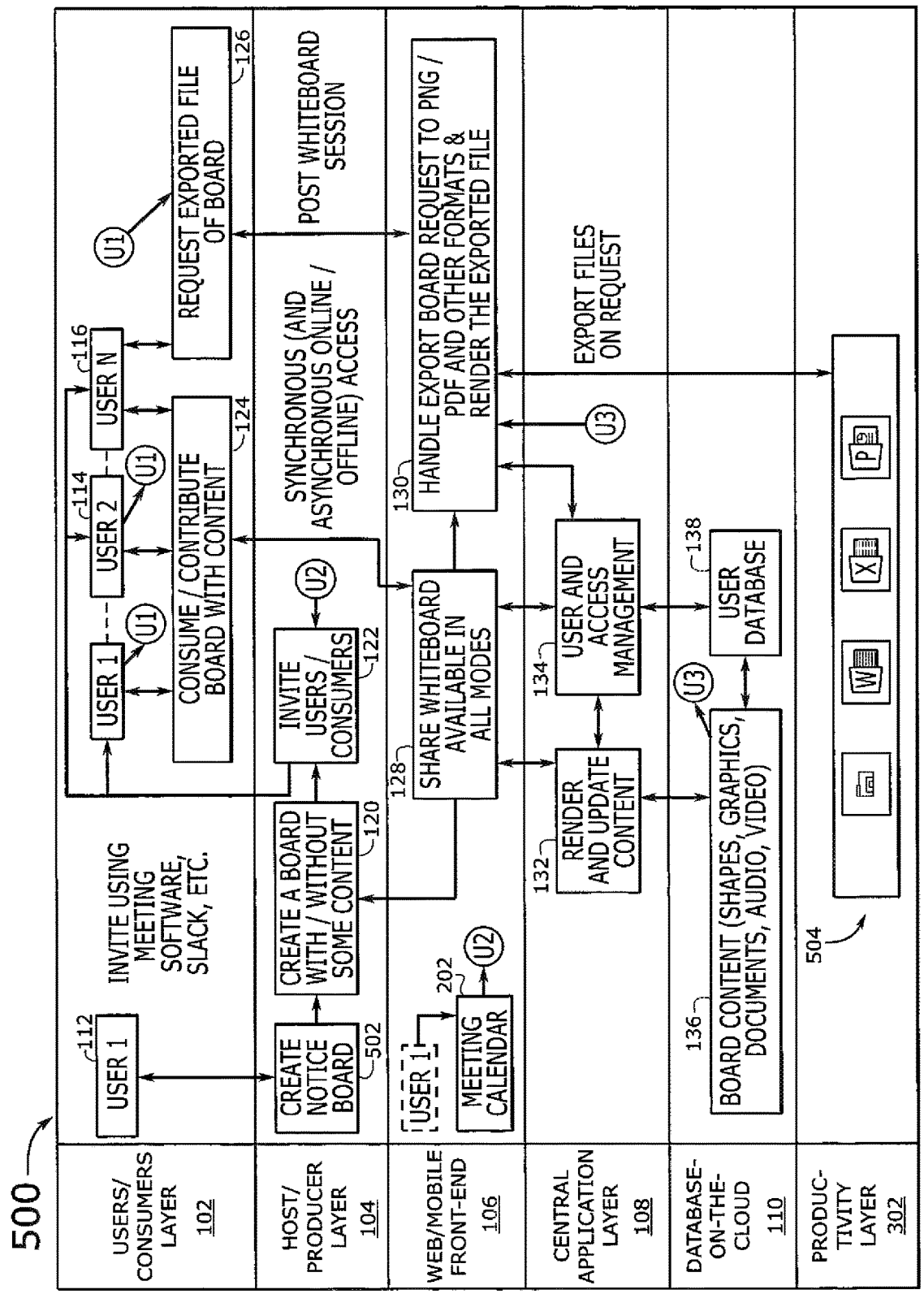
FIG. 5 conceptually illustrates a shared notice board process for creating, sharing, and using a shared notice board via the electronic universal shared utility board (EUSUB) infinite canvas system in some embodiments.

Demonstrating another aspect of the electronic universal shared utility board (EUSUB) infinite canvas system, FIG. 5 conceptually illustrates a shared notice board process for creating, sharing, and using a shared notice board 500 via the electronic universal shared utility board (EUSUB) infinite canvas system. In this figure, the whiteboard function (described above by reference to FIG. 1) is demonstrated as a notice board function, with similar features and availability options as those provided through the e-meeting board function (described above by reference to FIG. 2) and the productivity board function (described above by reference to FIG. 3) of the EUSUB infinite canvas system, showing the same architecture layers 102-110 and 302. Notably, however, the productivity layer 302 demonstrates a number of different applications and tools that are available to users of the notice board (also referred to in short as the "share noticeboard") feature. Instead of the productivity utility board tools 302 (as shown in FIG. 3), the notice board feature provides access to several notice board tools 504 through the productivity layer 302 of the EUSUB infinite canvas system.

Furthermore, the shared noticeboard is designed to allow users to dissipate or share information on their canvas via any number of notice boards that can be accessed offline/asynchronously, with "pinned documents" and audio, visual notes that can be updated and/or accessed by one or multiple users asynchronously. According, the shared notice board process for creating, sharing, and using a shared notice board 500 starts when a user (e.g., the first user 112) creates a notice board (at 502). As the other actions, operations, and features are similar to those noted above, the difference in this case is the asynchronous configuration of the notice board, which allows users to export files for the notice board on request when accessing through the central application layer 108. Thus, the first user 112, the second user 114, or any other invited/authorized user can export the notice board content to PNG/PDF, word processing software, spreadsheet software, presentation software, etc., among the notice board tools 504.

Figure 6:
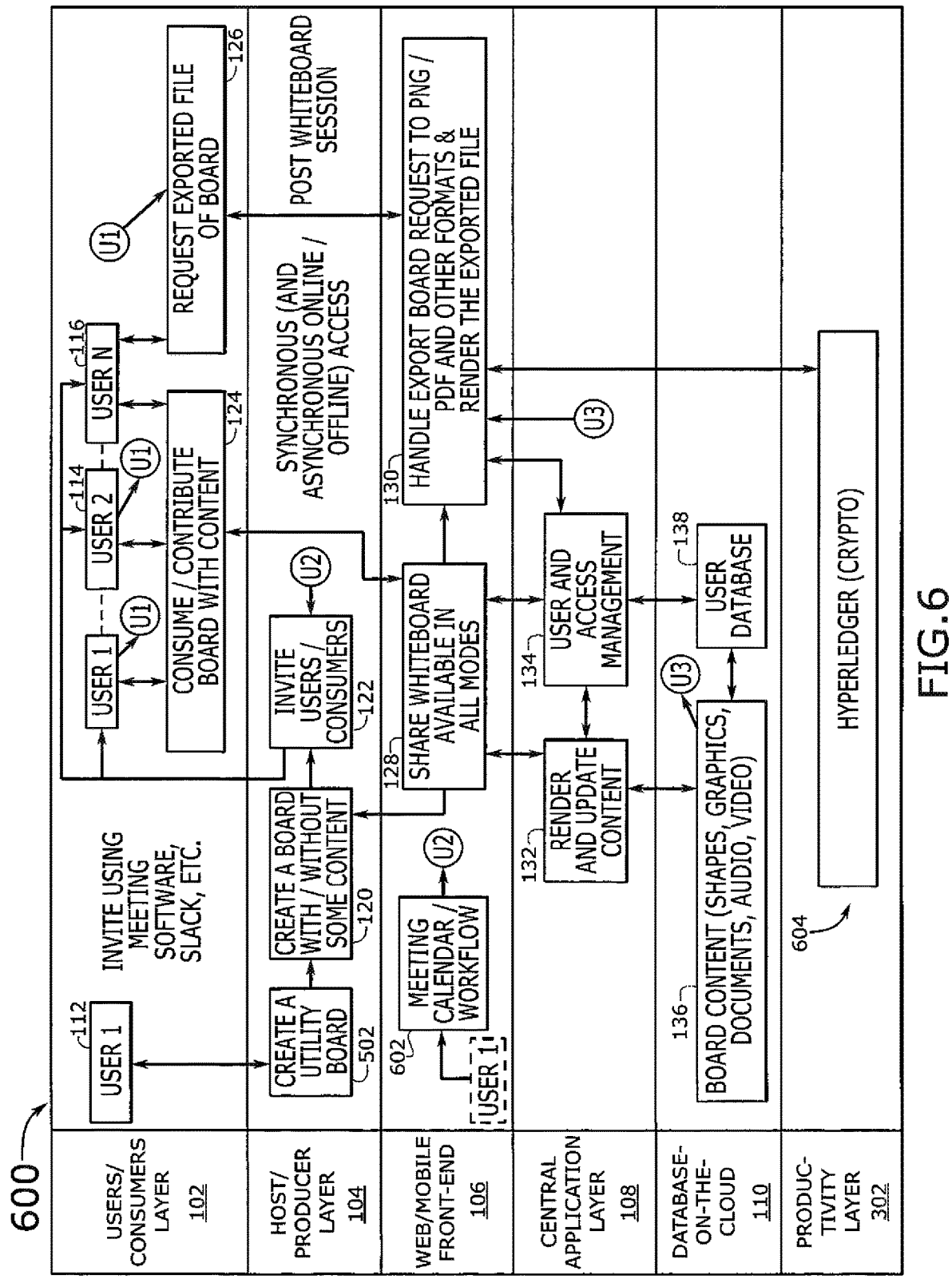
FIG. 6 conceptually illustrates a crytpo credentialing and signature board process for creating, sharing, and using a utility board for crypto-credentialing of signatures through blockchain in connection with the electronic universal shared utility board (EUSUB) infinite canvas system in some embodiments.

By way of another example, and referring to another aspect of the electronic universal shared utility board (EUSUB) infinite canvas system, FIG. 6 conceptually illustrates a crytpo-credentialing and signature board process 600 for creating, sharing, and using a utility board for crypto-credentialing of signatures through blockchain in connection with the EUSUB infinite canvas system.

The crypto-based credentialing and signature board feature (also referred to in short as the "crypto-based credentialing and signature board") is configured to enable users of multiple parties to synchronously and/or asynchronously review of one or more documents (as many documents as required). The crypto-based credentialing and signature board is further configured to enable recording audio and video of all the participants that could be used for credentialing. Additionally, the crypto-based credentialing and signature board is configured as an e-signature product that collects signatures, as needed, necessary, or required, to make the reviewed documents valid e-signed documents. Furthermore, the crypto-based credentialing and signature board is configured to export and immutably store any/all recorded audio, video, and all of the reviewed and e-signed documents to a blockchain. In some embodiments, the EUSUB infinite canvas system can be used for the crypto-based credentialing and signature board feature to immutably attach as a document (canvas) a hyper-ledger (blockchain) to ensure the contents of a collaboration event are never changed. Hence the EUSUB infinite canvas system can be extended as an authentication/accreditation/escrow tool as well.

In particular, this figure demonstrates that the utilized blockchain is a hyper-ledger blockchain 604 in the productivity layer 302. While the first user 112 (or whoever the host/producer may be) can create crypto-based credentialing and signature board as a standard utility board (at 502) and invite other users in the conventional way (at 122), it is also possible to using meeting calendar software to prescribe a day/time for review/signing of documents that are time-dependent, via meeting calendar/workflow (at 602). Notably, reviewed and signed documents are stored as blocks on the blockchain for each e-signature or each reviewed document/page. In some embodiments, a crypto currency component is supported by the hyperledger blockchain 604, such that a financial transaction may be completed through the crypto-based credentialing and signature board. For instance, a financial transaction to transfer an amount of value in crypto currency from a first review/signing party to a second party may be automatically transferred to the second party upon successful completion of the review/signing of all required documents/pages for of the crypto-based credentialing and signature board.

Figure 7:
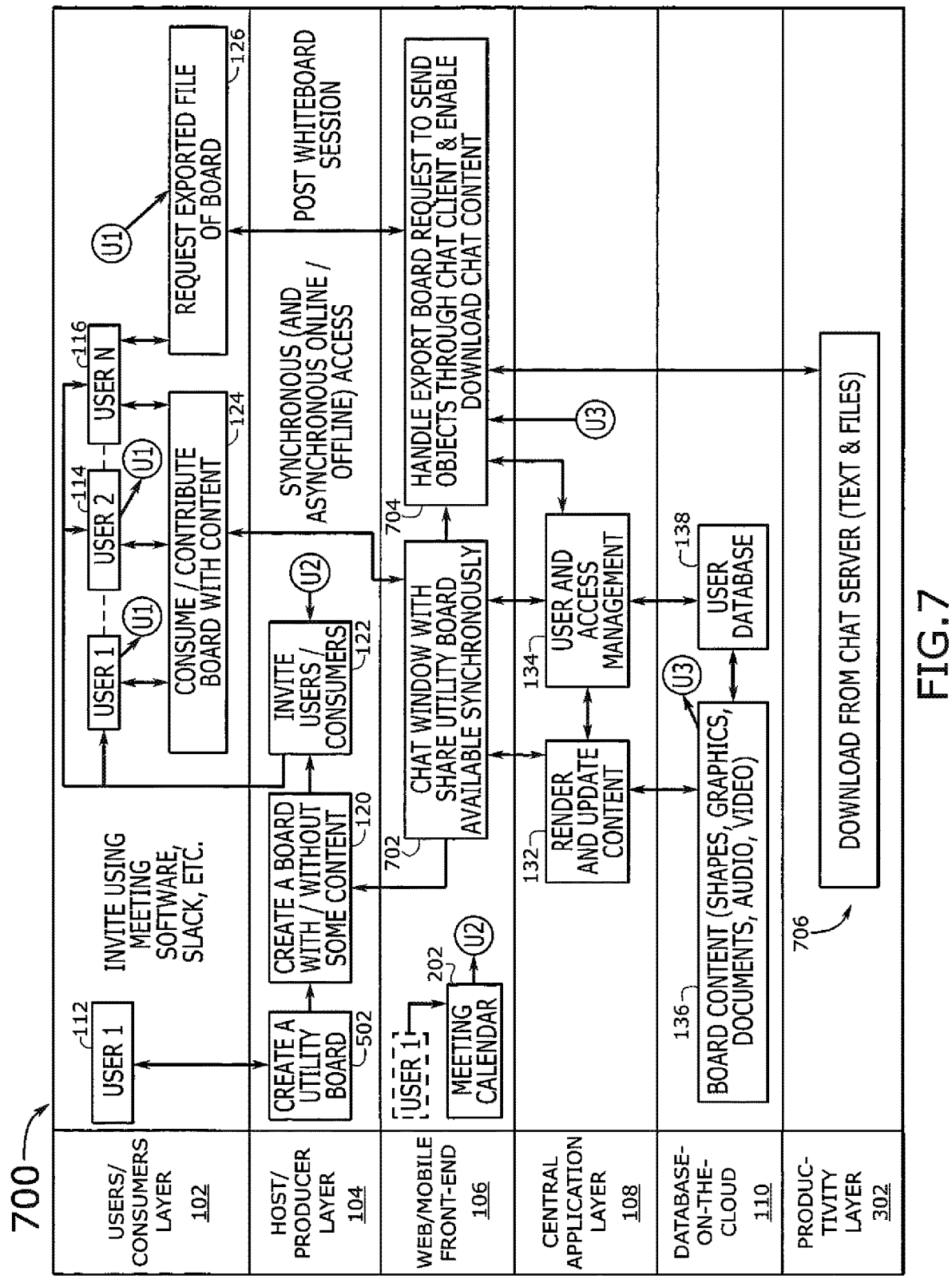
FIG. 7 conceptually illustrates a secure content-based chat board process for creating a utility board as a secure content-based chat board for users of the electronic universal shared utility board (EUSUB) infinite canvas system in some embodiments.

Another aspect of the electronic universal shared utility board (EUSUB) infinite canvas system is demonstrated in FIG. 7, which conceptually illustrates a secure content-based chat board process 700 for creating a utility board as a secure content-based chat board for users of the electronic universal shared utility board (EUSUB) infinite canvas system in some embodiments.

In some embodiments, the secure content-based chat board feature (also referred to in short as the "chat board") is built into the EUSUB infinite canvas system and configured to provide group and private chat, drawing tools, document sharing, and audio/video recording. In some embodiments, the secure content-based chat board is configured to allow object locking, which is a mechanism for locking of the objects in the chat to provide enhanced security during the chat. The secure content-based chat board provides such chat feature with the aforementioned tools so that it can be widely adopted and used for content-based chat, such as by education groups (teacher and students), professionals, healthcare professional groups, software development teams, and project teams, etc.

As shown in this figure, the secure content-based chat board process 700 provides steps for making the chat board with shared utility board to be available synchronously (at 702) and handling export board requests in a manner that sends objects through the chat client and enables downloading of chat content (at 704) via the chat server (at 706) provided at the productivity layer 302 and configured to allow such download of objects from the chat server, including text and file information shared in the chat window.

In addition to the several examples noted above, the EUSUB infinite canvas system of the present disclosure can be adapted for use in collecting user behavior while collaborating using the tool and adapted for use in generating analytics. As such, the EUSUB infinite canvas system could be used as a tool for behavioral analytics, user ranking systems, or other such uses.

Many of the above-described features and applications are implemented as software processes that are specified as a set of instructions recorded on a computer readable storage medium (also referred to as computer readable medium, machine readable medium, non-transitory computer readable medium, etc.). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, such as desktop software applications, web applications ("web apps"), mobile applications ("mobile apps"), etc., which can be read into memory for processing by a processor of a computing device, such as a computer, a mobile device, etc. Also, in some embodiments, multiple software inventions can be implemented as sub-parts, presented in several application architecture layers, of a larger application or program while remaining distinct software inventions. In some embodiments, multiple software inventions can also be implemented as separate applications or programs. Finally, any combination of separate applications or programs that together implement a software invention described here is within the scope of the invention. In some embodiments, the software programs or applications, when installed to operate on one or more electronic systems, define one or more specific machine implementations that execute and perform the operations of the software programs.

Figure 8:
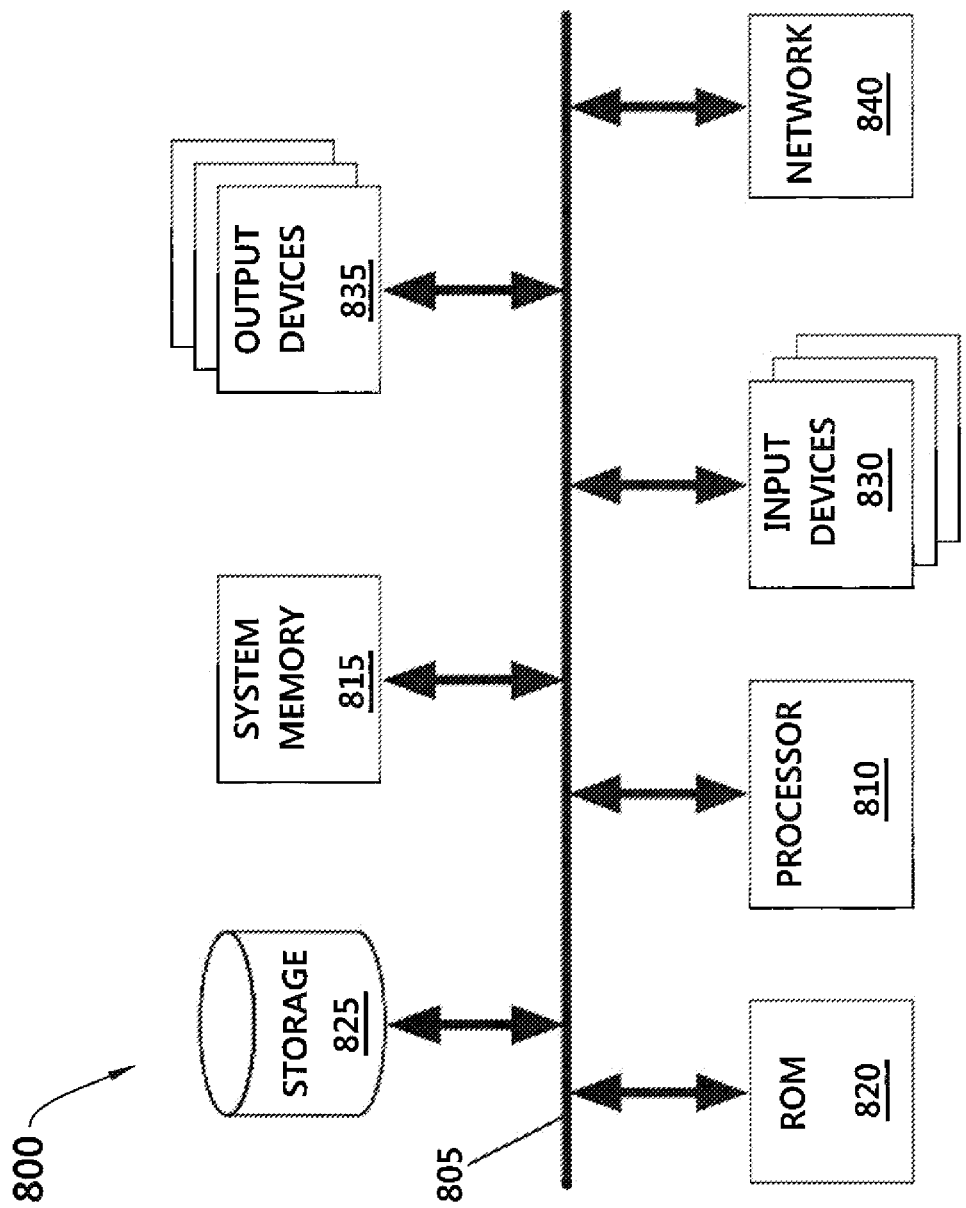
FIG. 8 conceptually illustrates an electronic system with which some embodiments of the invention are implemented.

By way of example, FIG. 8 conceptually illustrates an electronic system 800 with which some embodiments of the invention are implemented. The electronic system 800 may be a computer, a mobile device (such as a phone, smartphone, tablet, etc.), a personal digital assistant ("PDA"), or any other sort of electronic device. Such an electronic system includes various types of computer readable media and interfaces for various other types of computer readable media. Electronic system 800 includes a bus 805, processing unit(s) 810, a system memory 815, a read-only memory 820, a permanent storage device 825, input devices 830, output devices 835, and a network 840.

The bus 805 collectively represents all system, peripheral, and chipset buses that communicatively connect the numerous internal devices of the electronic system 800. For instance, the bus 805 communicatively connects the processing unit(s) 810 with the read-only memory 820, the system memory 815, and the permanent storage device 825.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 820 stores static data and instructions that are needed by the processing unit(s) 810 and other modules of the electronic system. The permanent storage device 825, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 825.

Other embodiments use a removable storage device (such as a floppy disk or a flash drive) as the permanent storage device 825. Like the permanent storage device 825, the system memory 815 is a read-and-write memory device. However, unlike storage device 825, the system memory 815 is a volatile read-and-write memory, such as a random access memory. The system memory 815 stores some of the instructions and data that the processor needs at runtime. In some embodiments, the invention's processes are stored in the system memory 815, the permanent storage device 825, and/or the read-only memory 820. For example, the various memory units include instructions for processing appearance alterations of displayable characters in accordance with some embodiments. From these various memory units, the processing unit(s) 810 retrieves instructions to execute and data to process in order to execute the processes of some embodiments.

The bus 805 also connects to the input and output devices 830 and 835. The input devices enable the user to communicate information and select commands to the electronic system. The input devices 830 include alphanumeric keyboards, pointing devices (also called "cursor control devices"), audio pickup devices ("microphones"), cameras, video cameras, etc. The output devices 835 display images, video, shared content, etc., generated by the electronic system 800 in connection with the EUSUB infinite canvas system. The output devices 835 include printers and display devices, such as liquid crystal displays (LCD) and organic light emitting diode (OLED) displays. Some embodiments include devices such as a touchscreen that functions as both input and output devices—receiving input via human touch gestures and outputting shared content across one or more boards for multiple users connected to the EUSUB infinite canvas system. The shared content includes graphics, such as shapes, icons for documents and audio/video pinned files, etc., and also includes mixed reality data including visual data combinations of augmented reality ("AR") graphical data, virtual reality ("VR") graphical data, other graphics, images, and videos, which are configured to augment and enhanced real-world collaboration between different users of the EUSUB infinite canvas system.

Finally, as shown in FIG. 8, bus 805 also couples electronic system 800 to a network 840 through a network adapter (not shown). In this manner, the electronic system 800 can be a part of a network of computers (such as a local area network ("LAN"), a wide area network ("WAN"), or an intranet), or a network of networks (such as the Internet). Any or all components of electronic system 800 may be used in conjunction with the invention.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An electronic universal shared utility board (EUSUB) infinite canvas system that is configured to provide a fully-integrated and all-in-one multi-user collaboration product, the EUSUB infinite canvas system comprising:

a plurality of collaborative board subsystems comprising a meeting board subsystem, a notice board subsystem, a whiteboard subsystem, a proctor board subsystem, a productivity utility board subsystem, a blockchain subsystem, a credentialing and signature board subsystem, and a chat board subsystem;

a computing device comprising a processor, a runtime memory, a non-transitory computer readable medium, and an EUSUB infinite canvas application stored on the non-transitory computer readable medium and, when executed on the processor, provides a cloud application service that is hosted by the computing device and is accessible over a network to a plurality of user computing devices operated by a plurality of users, wherein the cloud application service provides the plurality of user computing devices with access to the plurality of collaborative board subsystems;

a schedulable electronic meeting board ("e-meeting board") of the meeting board subsystem, wherein the e-meeting board is configured for synchronous sharing of information during a collaboration session between the plurality of users connected to the cloud application service over the network, wherein each user in the plurality of users is associated with and utilizes a user-specific canvas to which the user adds user-specific information comprising at least one of reference documents, audio/video annotations, and notes, wherein particular user-specific information added to a particular user-specific canvas utilized by a particular sharing user in the plurality of users and selected, by the particular sharing user, for synchronous sharing during the collaboration session with the plurality of users is attached to the e-meeting board as shared information accessible to the plurality of users for synchronous collaboration by the plurality of users during the collaboration session;

an electronic shared notice board of the notice board subsystem, wherein the shared notice board is configured for asynchronous sharing of information during and after the collaboration session between the plurality of users, wherein the shared information attached to the e-meeting board is attached to the shared notice board as asynchronously available shared information that is accessible to the plurality of users for offline asynchronous user access by the plurality of users;

an electronic shared whiteboard of the whiteboard subsystem, wherein the shared whiteboard is configured for synchronous sharing of whiteboard content during a whiteboard collaboration session between the plurality of users and configured for asynchronous sharing of whiteboard content during and after the whiteboard collaboration session, wherein particular user-specific whiteboard content contributed to the shared whiteboard during the whiteboard collaboration session is synchronously shared with the plurality of users, wherein a recording of the whiteboard collaboration session is posted in the shared whiteboard for asynchronous access to the particular user-specific whiteboard content and review of the recorded whiteboard collaboration session;

a proctoring board of the proctor board subsystem, wherein the proctoring board is configured to provide a proctoring interface that is exclusively accessible to a proctor user to set up a plurality of test boards with test information and share the plurality of test boards with a plurality of recipient users, wherein the proctoring board constrains accessibility of each test board in the plurality of test boards to one and only one recipient user in the plurality of recipient users, wherein each recipient user contributes information to the test board accessible to the recipient user while the proctor user maintains access to all the test boards in the plurality of test boards and monitors the information contributions of each recipient user with respect to the test board;

a productivity utility board of the productivity utility board subsystem, wherein the productivity utility board comprises a plurality of productivity tools in a productivity layer and an application programming interface (API) that is configured to export the information shared in the e-meeting board during the collaboration session and transfer the exported information to at least one productivity tool in the plurality of productivity tools for further use or archiving;

a crypto-based credentialing and signature board of the credentialing and signature board subsystem, wherein the crypto-based credentialing and signature board is communicably connected to a blockchain provided through the blockchain subsystem, wherein the crypto-based credentialing and signature board is configured to provide document review and signature credentialing tools for users of multiple parties to synchronously and asynchronously review one or more documents, provide signatures to sign off on the reviewed documents, and to record audio and video of all users of the multiple parties for credentialing, wherein the crypto-based credentialing and signature board is further configured as an e-signature product that collects the signatures of the reviewed documents as valid e-signed documents, wherein the crypto-based credentialing and signature board is further configured to export and immutably store the recorded audio and video and the reviewed e-signed documents to the blockchain; and a secure content-based chat board of the chat board subsystem, wherein the secure content-based chat board is configured to provide group and private chat, drawing tools, document sharing, audio/video recording, and in-chat secure object locking, wherein a synchronous chat session is accessible through the secure content-based chat board during the collaboration session between the plurality of users, wherein the synchronous chat session is recorded as an audio/video chat board recording that is pinned to the secure content-based chat board during the collaboration session and is securely stored for asynchronous playback after the collaboration session ends.

2. The EUSUB infinite canvas system of claim 1, wherein the particular user-specific information comprises a reference document.

3. The EUSUB infinite canvas system of claim 2, wherein the reference document is pinned to the e-meeting board for synchronous access by any user in the plurality of users during the collaboration session.

4. The EUSUB infinite canvas system of claim 3, wherein the pinned reference document is copied and attached to the shared notice board for asynchronous access by any user in the plurality of users during and after the collaboration session.

5. The EUSUB infinite canvas system of claim 4, wherein the pinned reference document is accessible through the e-meeting board and is eligible during the collaboration session for export by the plurality of users, wherein the copy of the reference document is accessible through the shared notice board during and is eligible during and after the collaboration session for export by the plurality of users.

6. The EUSUB infinite canvas system of claim 1, wherein an audio/video e-meeting board recording of the collaboration session between the plurality of users in the e-meeting board is pinned to the e-meeting board during the collaboration session.

7. The EUSUB infinite canvas system of claim 1 further comprising an annotation tool that is configured for annotation of audio/video recordings attached to one or more of the e-meeting board, the shared notice board, and the secure content-based chat board.

8. The EUSUB infinite canvas system of claim 7, wherein an annotating user in the plurality of users adds contextual annotations, via the annotation tool, to the audio/video e-meeting board recording during the collaboration session.

9. The EUSUB infinite canvas system of claim 8, wherein a copy of the annotated audio/video e-meeting board recording is attached to the shared notice board after the collaboration ends.

10. The EUSUB infinite canvas system of claim 9, wherein the annotated audio/video e-meeting board is unpinned and detached from the e-meeting board after the copy of the annotated audio/video e-meeting board recording is attached to the shared notice board.

11. The EUSUB infinite canvas system of claim 9, wherein the copy of the annotated audio/video e-meeting board recording is accessible to the plurality of users from the shared notice board for asynchronous playback, review, and annotation updates by the plurality of users.

12. The EUSUB infinite canvas system of claim 1, wherein the particular whiteboard user contributes the particular user-specific whiteboard content to the shared whiteboard through the user-specific canvas of the particular whiteboard user.

13. The EUSUB infinite canvas system of claim 1, wherein the API is further configured to export the whiteboard content contributed to and shared on the shared whiteboard during the whiteboard collaboration session.

14. The EUSUB infinite canvas system of claim 1, wherein the audio/video chat board recording of the synchronous chat session is securely stored as an attachment audio/video file to the shared notice board.

\* \* \* \* \*